(12) United States Patent
Kumagai et al.

(10) Patent No.: US 9,979,324 B2
(45) Date of Patent: May 22, 2018

(54) METHOD FOR CONTROLLING ULTRASONIC MOTOR AND SURVEYING INSTRUMENT FOR THE SAME

(71) Applicant: TOPCON CORPORATION, Tokyo (JP)

(72) Inventors: Kaoru Kumagai, Tokyo (JP); Satoshi Yanobe, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days. days.

(21) Appl. No.: 15/490,457

(22) Filed: Apr. 18, 2017

(65) Prior Publication Data

US 2017/0310248 A1  Oct. 26, 2017

(30) Foreign Application Priority Data

Apr. 22, 2016 (JP) .................................. 2016-085770

(51) Int. Cl.
*H01L 41/04* (2006.01)
*H02N 2/14* (2006.01)
*G01C 15/00* (2006.01)

(52) U.S. Cl.
CPC ........... *H02N 2/142* (2013.01); *G01C 15/002* (2013.01)

(58) Field of Classification Search
CPC ............................. H02N 2/142; G01C 15/002
USPC ......................................................... 318/116
See application file for complete search history.

(56) References Cited

U.S. PATENT DOCUMENTS

| | | | | |
|---|---|---|---|---|
| 5,173,631 A * | 12/1992 | Suganuma | ............... | H02N 2/14 310/316.02 |
| 5,198,732 A * | 3/1993 | Morimoto | ................ | H02N 2/14 310/316.02 |
| 5,210,454 A * | 5/1993 | Naito | ..................... | H02N 2/142 310/316.02 |
| 6,570,294 B1 * | 5/2003 | Iino | ........................ | H02N 2/142 310/316.01 |
| 7,834,515 B2 * | 11/2010 | Tanimura | ............... | H02N 2/145 310/317 |
| 2002/0138998 A1 * | 10/2002 | Hamada | ................... | G01C 1/02 33/290 |
| 2014/0196293 A1 | 7/2014 | Kodaira et al. | | |

(Continued)

FOREIGN PATENT DOCUMENTS

JP  2014-137299 A  7/2014

*Primary Examiner* — Eduardo Colon Santana
*Assistant Examiner* — Gabriel Agared
(74) *Attorney, Agent, or Firm* — Roberts Mlotkowski Safran Cole & Calderon P.C.

(57) ABSTRACT

Provided is a method for controlling an ultrasonic motor provided at a rotary shaft of a surveying instrument to meet requirements for a rotation speed and a plurality of operation modes, and a surveying instrument for the same. In the present invention, the ultrasonic motor is controlled by a first signal having a square wave in a range of rotation speed of the rotary shaft from zero to a first speed, controlled by a second signal in which rises or falls of the square wave are sloped in a range from the first speed to a second speed, controlled by a third signal in which rises and falls of the square wave are sloped in a range from the second speed to a third speed, and controlled by a fourth signal in which the drive signal is continuously applied in a range higher than the third speed.

4 Claims, 7 Drawing Sheets

(56) References Cited

U.S. PATENT DOCUMENTS

2014/0340002 A1* 11/2014 Nishimoto ............ H02N 2/142
                                                                    318/116

* cited by examiner

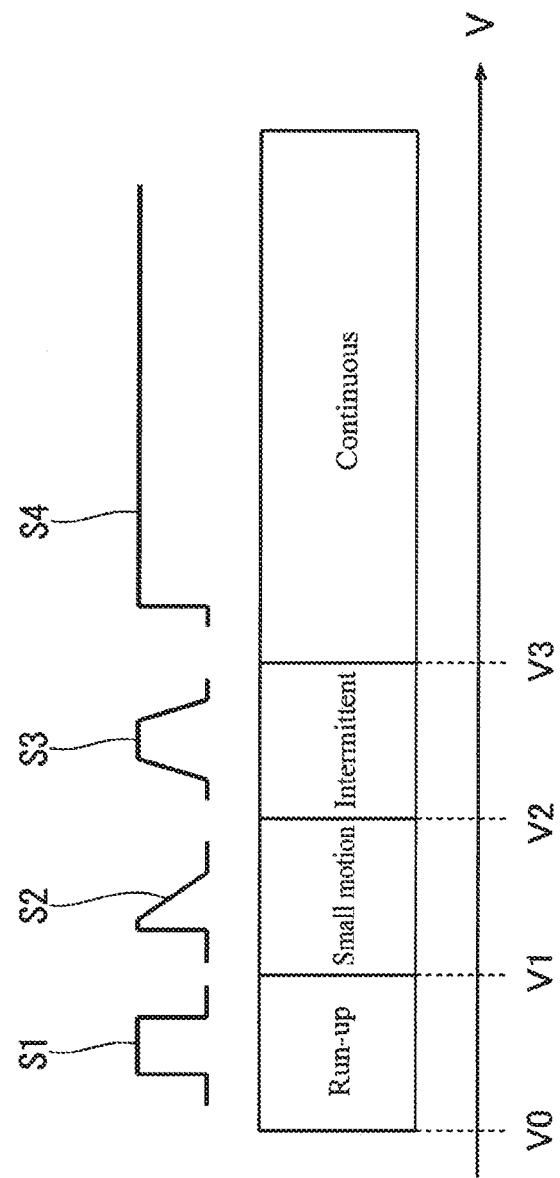

Fig. 7

|  | Continuous (S4) | Intermittent (S3) | Small motion (S2) | Run-up (S1) |
|---|---|---|---|---|
| Automatic collimation mode | f : fmin~fj<br>WT : Ams<br>OT : Ams | f : fj<br>WT : Ams<br>RT : 0.5Ams<br>FT : 0.5Ams<br>OT : Over zero ~ Ams | f : fmin~fmax<br>WT : Ams<br>RT : 0.02Ams<br>FT : 0.5Ams<br>OT : Over zero ~ Ams | f : fmin~fmax<br>WT : Ams<br>RT : 0ms<br>FT : 0ms<br>OT : Over zero ~ Ams |
| Manual collimation mode | — | (High speed)<br>f : fmax ± α<br>WT : Ams<br>RT : 0.5Ams<br>FT : 0.5Ams<br>OT : Over zero ~ Ams | (Low speed)<br>f : fmax<br>WT : 2.5Ams<br>RT : 0.02Ams<br>FT : 1.25Ams<br>OT : Over zero ~ Ams | — |
| Automatic tracking mode | f : fmin~fmax<br>WT : ams<br>OT : ams | f : fmax<br>WT : ams<br>RT : 0.5ams<br>FT : 0.5ams<br>OT : Over zero ~ Ams | f : fmin~fmax<br>WT : ams<br>RT : 0.04ams<br>FT : 0.5ams<br>OT : Over zero ~ Ams | f : fmin~fmax<br>WT : ams<br>RT : 0ms<br>FT : 0ms<br>OT : Over zero ~ Ams |

METHOD FOR CONTROLLING ULTRASONIC MOTOR AND SURVEYING INSTRUMENT FOR THE SAME

TECHNICAL FIELD

The present invention relates to a method for controlling an ultrasonic motor that drives a rotary shaft of a surveying instrument, and a surveying instrument for the same.

BACKGROUND ART

A surveying instrument, for example, a total station includes a telescope that collimates a measurement point, a bracket portion that supports the telescope rotatably in the vertical direction, and a base that supports the bracket portion rotatably in the horizontal direction. The telescope is driven by a vertical rotary motor provided on a vertical rotary shaft, and the bracket portion is driven by a horizontal rotary motor provided on a horizontal rotary shaft. Patent Document 1 discloses a surveying instrument adopting ultrasonic motors as the vertical rotary motor and the horizontal rotary motor.

In addition to a mode in which collimation is manually performed by an operator, many surveying instruments have an automatic collimation mode in which automatic rotation to a predetermined survey point is performed, and an automatic tracking mode in which a moving target is automatically tracked.

CITATION LIST

Patent Document

[Patent Document 1] Japanese Published Unexamined Patent Application No. 2014-137299

SUMMARY OF THE INVENTION

Problems to be Solved by the Invention

In the automatic collimation mode, high-speed rotation to a predetermined survey point is desired. On the other hand, in the automatic tracking mode, to track a target that an operator carries, low-speed rotation at approximately 5 [°/s] is necessary. In the manual collimation mode, fine adjustment after large rotation to a survey point is desired. Thus, a surveying instrument has a problem in which required control differs depending on an operation mode.

It is difficult for an ultrasonic motor to rotate at a low speed during continuous driving, and at the time of low-speed rotation, the speed is controlled by intermittent driving in which a drive signal is applied/stopped. However, when intermittent driving is performed, an abnormal noise occurs at rises and falls of the drive signal. Therefore, there is a problem in which during low-speed rotation, an operator is bothered by a tradeoff relationship between whether to make larger the signal waveform by considering rotation smoothness or whether to make smaller the signal waveform to reduce the noise.

In order to solve the above-described problem, an object of the present invention is to provide a method for controlling an ultrasonic motor to meet requirements for a rotation speed and a plurality of operation modes by setting a drive signal according to the rotation speed and the plurality of operation modes in a surveying instrument adopting the ultrasonic motor for a rotary shaft, and a surveying instrument for the same.

Means for Solving the Problems

In order to solve the above-described problems, a method for controlling an ultrasonic motor according to an aspect of the present invention is a method for controlling an ultrasonic motor that drives a rotary shaft of a surveying instrument in response to a drive signal with a variable frequency, wherein the ultrasonic motor is controlled by a first drive signal in which a square wave is formed by applying and stopping the drive signal in control cycles, in a range of rotation speed of the rotary shaft from zero to a first rotation speed, the ultrasonic motor is controlled by a second drive signal in which rises or falls of the square wave are sloped in a range from the first rotation speed to a second rotation speed, the ultrasonic motor is controlled by a third drive signal in which rises and falls of the square wave are sloped in a range from the second rotation speed to a third rotation speed, and the ultrasonic motor is controlled by a fourth drive signal in which the drive signal is continuously applied in a range higher than the third rotation speed.

In the aspect described above, it is also preferable that the control cycles and the frequencies of the first to fourth drive signals, acceleration periods as times of application of the drive signal in the first to third drive signals, and values of the slopes of the second and third drive signals, are set for each of a plurality of operation modes of the surveying instrument.

In the aspect described above, it is also preferable that in at least one of the operation modes, at least one of controls by the first to fourth drive signals is omitted.

In order to solve the above-described problems, a surveying instrument according to an aspect of the present invention includes a control unit that performs control by a first drive signal in which a square wave is formed by applying and stopping the drive signal in control cycles in a range of rotation speed of the rotary shaft from zero to a first rotation speed, performs control by a second drive signal in which rises or falls of the square wave are sloped in a range from the first rotation speed to a second rotation speed, performs control by a third drive signal in which rises and falls of the square wave are sloped in a range from the second rotation speed to a third rotation speed, and performs control by a fourth drive signal in which the drive signal is continuously applied in a range higher than the third rotation speed.

Effect of the Invention

The present invention provides a method for controlling an ultrasonic motor to meet requirements for a rotation speed and a plurality of operation modes by setting a drive signal according to the rotation speed and the plurality of operation modes in a surveying instrument adopting the ultrasonic motor for a rotary shaft, and a surveying instrument for the same.

BRIEF DESCRIPTION OF THE DRAWINGS

FIG. 5 is a control image diagram of the ultrasonic motor according to the present embodiment.

FIG. 7 is a setting example of values for each operation mode of the ultrasonic motor according to the present embodiment.

DESCRIPTION OF EMBODIMENTS

Next, a preferred embodiment of the present invention is described with reference to the drawings.

Figure 1:
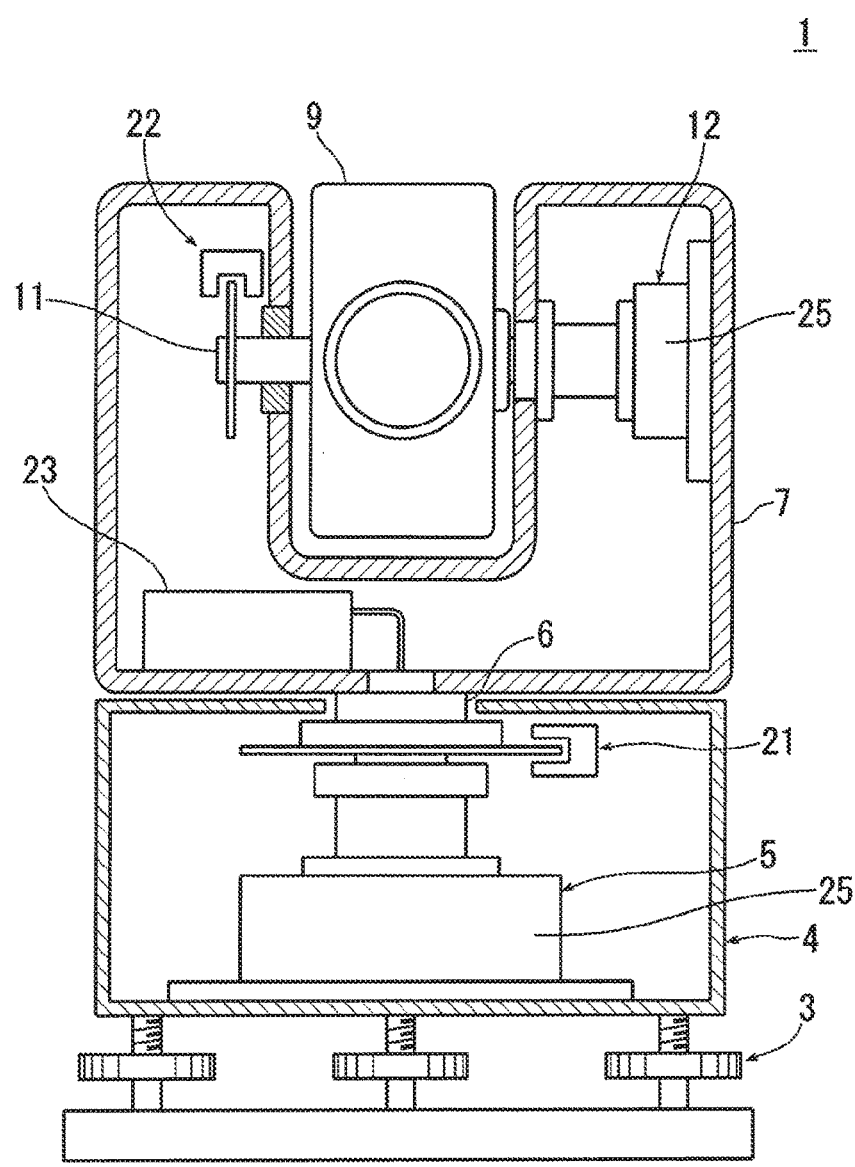
FIG. 1 is a schematic longitudinal sectional view of a surveying instrument according to the present embodiment.

FIG. 1 is a schematic longitudinal sectional view of a surveying instrument according to the present embodiment. The reference numeral 1 denotes a surveying instrument, and the surveying instrument 1 includes a base 4 provided on a leveling portion 3, a bracket portion 7 that rotates horizontally around a horizontal rotary shaft 6 on the base 4, and a telescope 9 that is supported by the bracket portion 7 and rotates vertically around a vertical rotary shaft 11. The bracket portion 7 houses a control unit 23. The surveying instrument 1 has three kinds of operation modes including a manual collimation mode in which a target is manually collimated, an automatic collimation mode in which automatic rotation to a predetermined survey point is performed, and an automatic tracking mode in which a moving target is automatically tracked.

Figure 2:
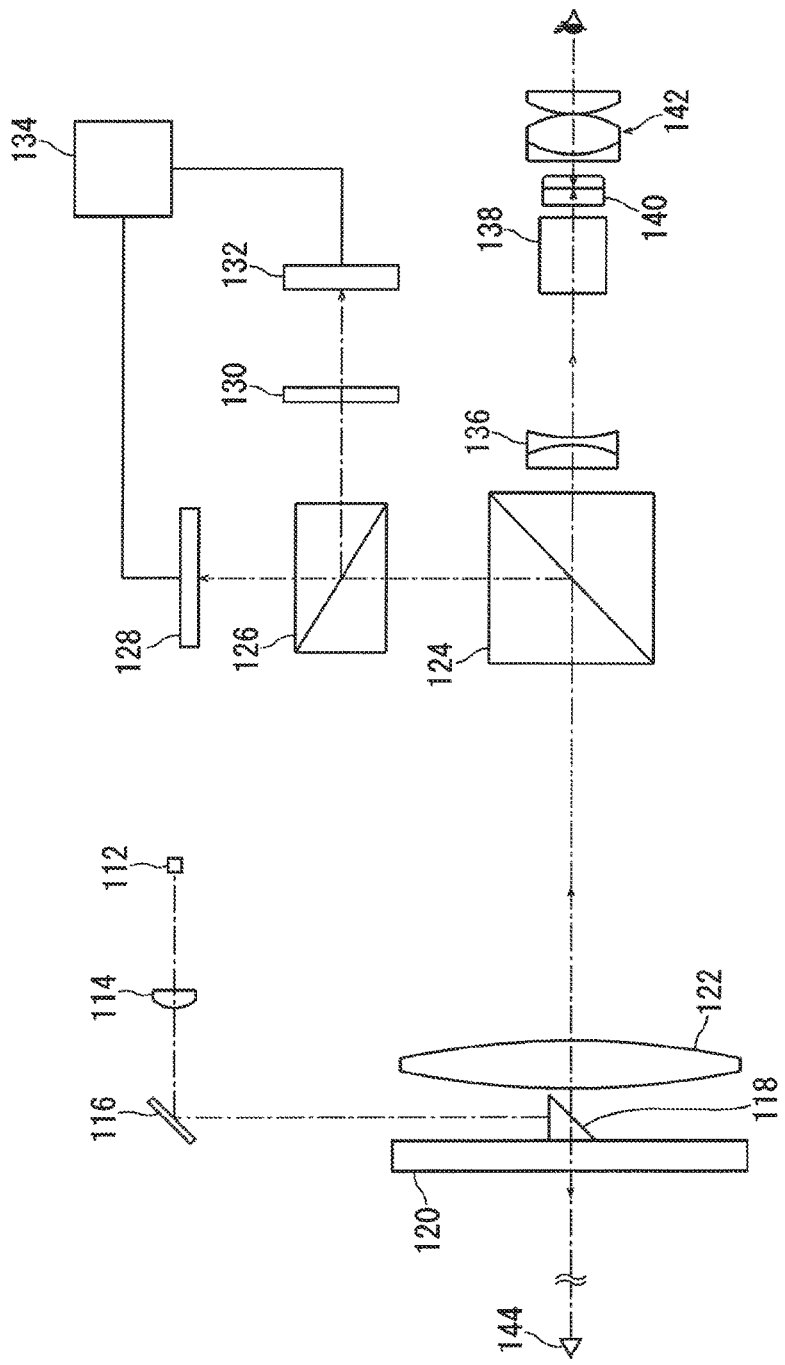
FIG. 2 is a block diagram showing a configuration of an optical system of the surveying instrument according to the present embodiment.

The telescope 9 houses a range-finding optical system for automatic collimation, a tracking optical system for automatic tracking, and a telescope optical system for manual collimation. FIG. 2 is a block diagram showing a configuration of an optical system of the surveying instrument 1, showing an example of a configuration of the optical system. A light source 112 is a laser diode that emits, for example, infrared light as range-finding light or tracking light. Light emitted from the light source 112 is transmitted through a light transmission lens 114 and enters a reflecting mirror 116, enters a light transmission prism 118, and is then transmitted toward a target 144 via a parallel glass 120, and reflected on the target 144. The reflected light enters a dichroic prism 124 via the parallel glass 120 and an object lens 122. A part of the reflected light is transmitted as collimation light through a focusing lens 136 and an erect prism 138 and forms an image on a focusing glass 140, and forms an image on an operator's retina via an eyepiece lens 142. The remainder of the reflected light enters a beam splitter 126 and is split. One of the split lights enters a first imaging element 128, and the other one of the split lights is transmitted through a wavelength filter 130 that removes infrared light, and then enters a second imaging element 132.

The first imaging element 128 and the second imaging element 132 are image sensors, for example, CCD sensors or CMOS sensors. Images imaged by the imaging elements 128 and 132 are transmitted to an image processing device 134 and subjected to image processing. A scenery image including infrared light of the light source 112 is imaged by the first imaging element 128, and a scenery image from which infrared light of the light source 112 is removed is imaged by the second imaging element 132. The image processing device 134 obtains a difference between the image of the first imaging element 128 corresponding to a lighted image and the image of the second imaging element 132 corresponding to an unlighted image. By obtaining the difference, a center of the image of the target 144 can be obtained. Operation results of the image processing device 134 are transmitted to the control unit 23, and the control unit 23 detects, as a target position, a position at which a deviation between the center of the image of the target 144 and a center of a visual axis of the telescope falls within a predetermined value, and performs automatic collimation and automatic tracking. For the optical system described above, other conventionally known configurations may be adopted, and in particular, elements of the optical system described above may be altered based on knowledge of a person skilled in the art.

As shown in FIG. 1, an ultrasonic motor 5 for horizontal rotation is provided at a lower end portion of a horizontal rotary shaft 6, and an encoder 21 for horizontal angle detection is provided at an upper end portion. At one end portion of the vertical rotary shaft 11, an ultrasonic motor 12 for vertical rotation is provided, and at the other end portion, an encoder 22 to detect a vertical angle is provided. The encoders 21 and 22 are absolute encoders each including a rotary disc, a slit, a light emitting diode, and an image sensor. Other than absolute encoders, incremental encoders may be used.

Figure 3:
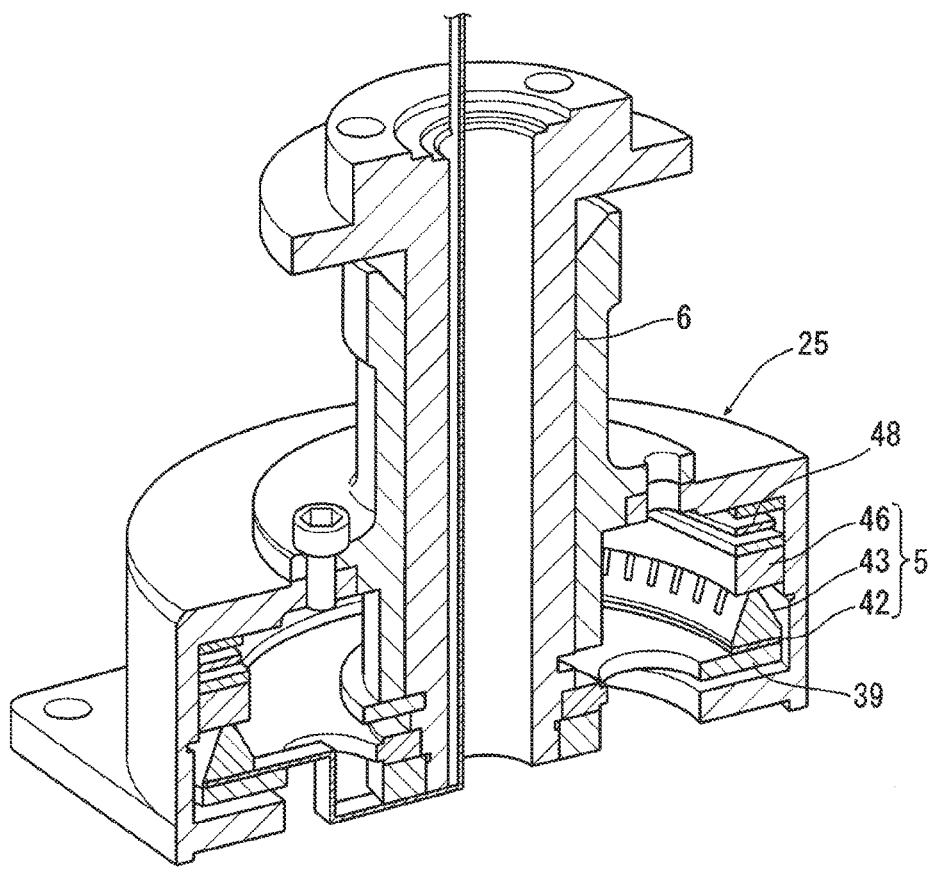
FIG. 3 is a sectional perspective view of a portion including an ultrasonic motor according to the present embodiment.

FIG. 3 is a sectional perspective view of a portion including the ultrasonic motor 5 shown in FIG. 1. Concerning configurations of the ultrasonic motors 5 and 12, configurations for vertical rotation and horizontal rotation are equivalent to each other, so that a configuration for horizontal rotation is mainly described. The ultrasonic motor 5 includes, in a ring form, in order from the base portion 39, a piezoelectric ceramic 42 that generates vibration, a stator 43 that amplifies the vibration, a rotor 46 that interferes with the stator 43, and a wave washer 48 that presses the rotor 46 toward the stator 43 side. To the piezoelectric ceramic 42, a Sin electrode and a Cos electrode are attached, and when a drive voltage is alternately applied to these electrodes, the piezoelectric ceramic 42 ultrasonically vibrates. When the piezoelectric ceramic 42 vibrates, a wavelike traveling wave is formed in the stator 43, and due to friction caused by pressing of the wave washer 48, the stator 43 and the rotor 46 rotate relative to each other. As shown in FIG. 1, in the horizontal ultrasonic motor 5, a motor case 25 is fixed to the base 4 and a rotor 46 is fixed to the motor case 25, so that when the stator 43 rotates, the horizontal rotary shaft 6 rotates integrally with the stator 43 via the base portion 39. In the vertical ultrasonic motor 12, a stator 43 is fixed to a motor case 25, and when a rotor 46 rotates, the vertical rotary shaft 11 rotates integrally with the rotor 46.

Figure 4:
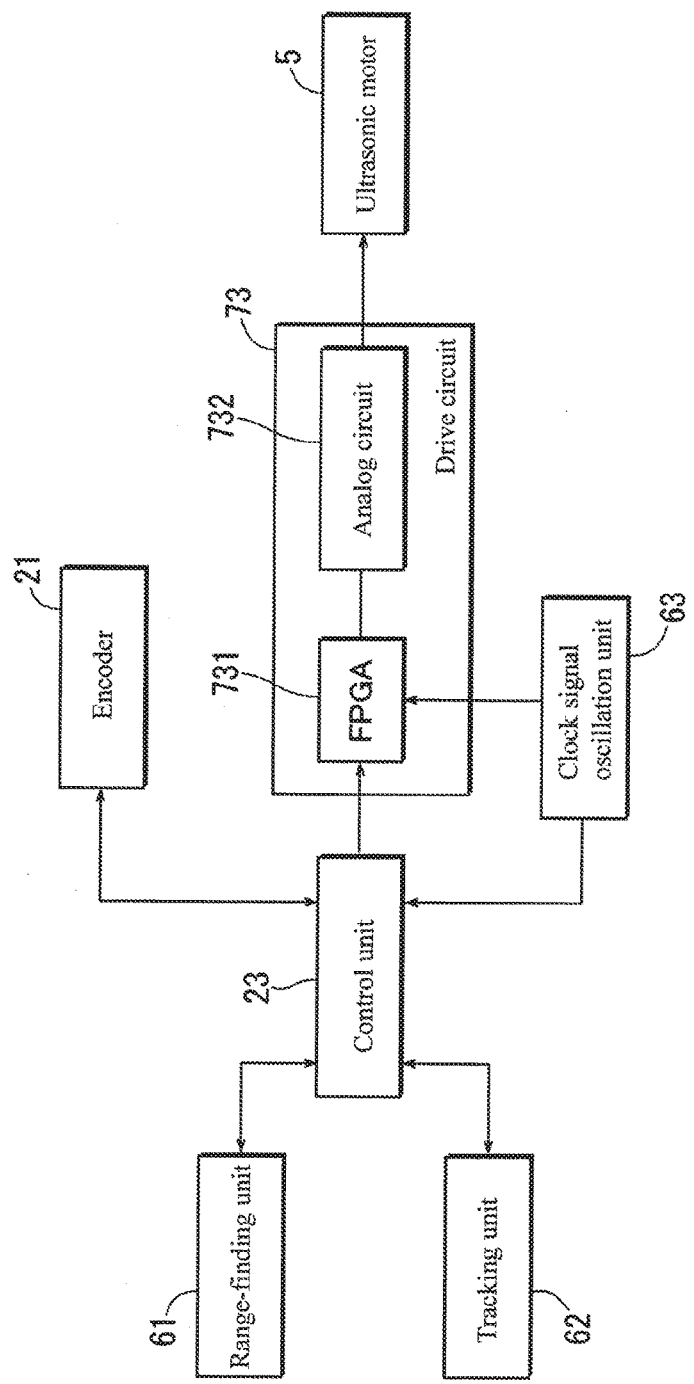
FIG. 4 is a control block diagram of the surveying instrument according to the present embodiment.

FIG. 4 is a control block diagram of the surveying instrument 1. Block diagrams of vertical rotation and horizontal rotation are equivalent to each other, so that the horizontal rotation is shown, and description on the vertical rotation is omitted. The surveying instrument 1 includes a control unit 23, an encoder 21, a range-finding unit 61, a tracking unit 62, a clock signal oscillation unit 63, a drive circuit 73, and the ultrasonic motor 5.

The control unit 23 consists of a microcontroller including a CPU, a ROM, and a RAM, etc., mounted on an integrated circuit. Software of the control unit 23 is changeable from an external personal computer that is not shown. The control unit 23 sequentially obtains a rotation speed of the rotary shaft 6 from an angle signal of the encoder 21. In addition, the control unit outputs a drive signal to the ultrasonic motor 5 via a drive circuit 73. Then, the control unit changes the waveform of the drive signal according to the rotation speed of the rotary shaft 6. A waveform of this drive signal is described in detail below.

The range-finding unit 61 performs automatic collimation under control of the control unit 23 by irradiating a target with range-finding light by using the range-finding optical system and capturing a target by the light reflected thereon. In addition, when manual or automatic collimation is completed, the range-finding unit performs range-finding. Under control of the control unit 23, the tracking unit 62 irradiates a target with tracking light by using the tracking optical system and captures the target by the light reflected thereon, and automatically tracks the target when the target moves.

The drive circuit 73 includes an FPGA (Field Programmable Gate Array) 731 and an analog circuit 732. Definition of an internal logic circuit of the FPGA 731 can be changed by the control unit 23 or an external device not shown. The FPGA 731 can generate a control signal at a variable drive frequency (drive signal frequency) and a variable amplitude, and can dynamically change the drive frequency and the amplitude. The analog circuit 732 includes a transformer, etc., and amplifies the control signal. The drive circuit 73 outputs the control signal from the FPGA 731 in response to a command from the control unit 23, and amplifies the control signal by the analog circuit 732 to generate two kinds of drive signals with different phases, and outputs these to the Sin electrode and the Cos electrode attached to the piezoelectric ceramic 42 of the ultrasonic motor 5. For the drive circuit 73, other PLDs (Programmable Logic Devices) such as an ASIC (Application Specific Integrated Circuit) may be used.

The clock signal oscillation unit 63 outputs a clock signal to the control unit 23 and the FPGA 731. The control unit 23 controls light emission cycles of the encoder 21 based on the clock signal. The FPGA 731 controls an amplitude, a drive frequency, and control cycles of the drive signal, and controls, in a low-speed rotation range, a ratio of an acceleration period (time of application of the drive signal) and a deceleration period (time of stoppage of the drive signal) in each control cycle based on the clock signal. In this specification, the low-speed rotation range means a speed range in which the ultrasonic motor cannot be continuously driven to rotate. This low-speed rotation range differs among individual ultrasonic motors according to their manufacturing states, and is defined in advance in the control unit 23 by investigating characteristics of the ultrasonic motor to be adopted.

FIG. 5 is a control image diagram of the ultrasonic motor 5 according to the present embodiment. Hereinafter, although description about vertical rotation is also omitted, the same control as in the case of horizontal rotation is also performed for vertical rotation.

The horizontal axis of FIG. 5 represents a rotation speed V of the rotary shaft 6. For a while from the zero rotation speed, power sufficient to overcome static friction between the stator 43 and the rotor 46 is necessary. Therefore, in a range from the zero rotation speed (V0) to a first rotation speed (V1), a smooth start of movement is obtained by making square the waveform of the drive signal. Therefore, this section is positioned as a run-up section, and the drive signal in the run-up section is formed into a square wave (first drive signal S1).

Next, when the rotation speed becomes equal to or higher than the first rotation speed V1, movement has been successfully started, so that a noise problem must be handled next while the start of movement is maintained. The ultrasonic motor 5 causes an abnormal noise at rises and falls of the drive signal. Therefore, in a range from the first rotation speed V1 to a second rotation speed V2, by sloping either the rises or the falls of the square wave, both maintenance of the start of movement and the noise problem can be handled. This section is positioned as a small motion section, and the drive signal in the small motion section is formed into a square wave or triangle wave with a single slope (second drive signal S2).

Next, when the rotation speed becomes equal to or higher than the second rotation speed V2, the ultrasonic motor has already started to move, so that the focus is preferably on the noise problem. Therefore, in the range from the second rotation speed V2 to a third rotation speed V3, both of the rises and the falls of the square wave are sloped to reduce noise sounding. This section is positioned as an intermittent section, and the drive signal in the intermittent section is formed into a square wave or a triangle wave with double slopes (third drive signal S3).

Finally, when the rotation speed becomes equal to or higher than the third rotation speed V3, the ultrasonic motor 5 comes out of the low-speed rotation range. Therefore, at the rotation speed equal to or higher than the third rotation speed V3, intermittent driving is stopped, and the drive signal is continuously applied. This section is called a continuous section, and the drive signal in the continuous section is constant (fourth drive signal S4).

Values of the first rotation speed V1, the second rotation speed V2, and the third rotation speed V3 are set in advance in the control unit 23 according to individual characteristics of the adopted ultrasonic motor. In this specification, "range from the first rotation speed V1 to the second rotation speed V2" means "range not less than the first rotation speed V1 and less than the second rotation speed V2."

Figure 6A:
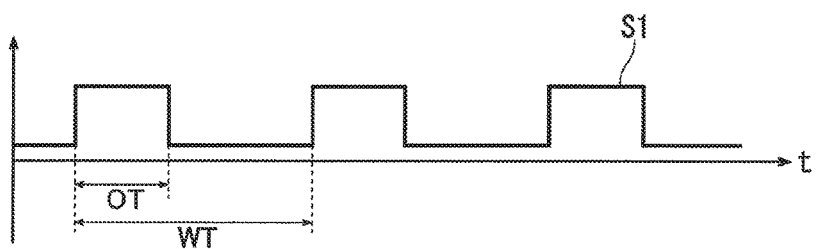
FIG. 6A is a waveform diagram of a first drive signal.
Figure 6B:
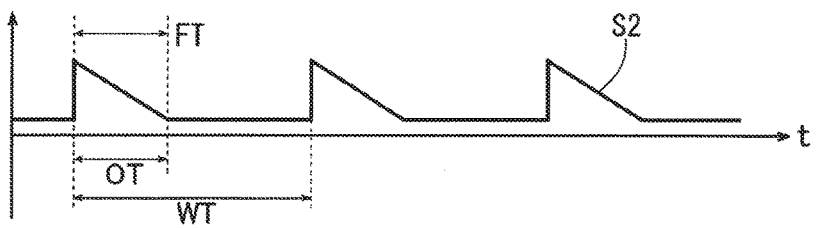
FIG. 6B is a waveform diagram of a second drive signal.
Figure 6C:
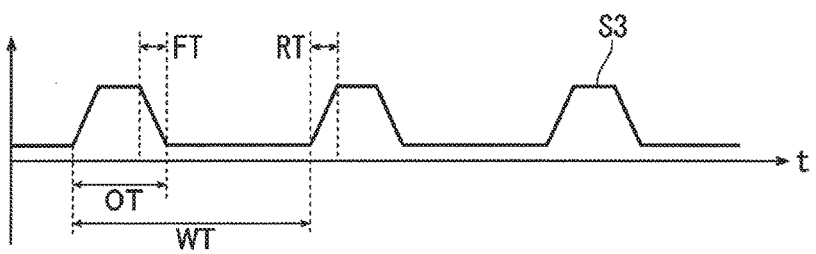
FIG. 6C is a waveform diagram of a third drive signal.
Figure 6D:
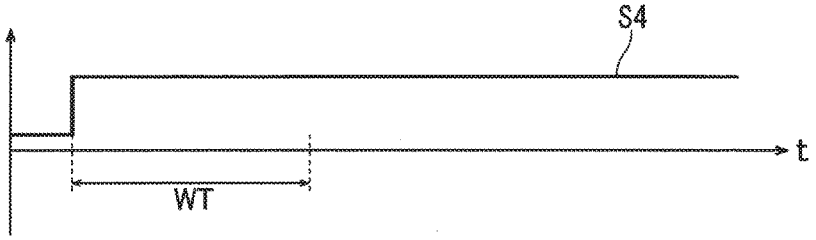
FIG. 6D is a waveform diagram of a fourth drive signal.

FIG. 6 are waveform diagrams of the drive signals of the ultrasonic motor 5 in the respective sections described above, and FIG. 6(a) is a waveform diagram of the first drive signal S1, FIG. 6(b) is a waveform diagram of the second drive signal S2, FIG. 6(c) is a waveform diagram of the third drive signal S3, and FIG. 4(d) is a waveform diagram of the fourth drive signal S4. In each of these figures, the horizontal axis represents time (t), and the vertical axis represents an amplitude of the drive signal. In FIG. 6, the reference sign WT denotes a control cycle, the reference sign RT denotes a time in which a rise of the signal is sloped (sloped upward), the reference sign FT denotes a time in which a fall of the signal is sloped (sloped downward), and the reference sign OT denotes an acceleration time (acceleration period) in which the drive signal is applied in the low-speed rotation range. The upward slope RT and the downward slope FT are not limited to the linear functional lines shown in the figures, and may be curved slopes.

Thus, by changing the waveform of the drive signal to the first drive signal S1, the second drive signal S2, the third drive signal S3, or the fourth drive signal S4 in response to the rotation speed V of the rotary shaft 6, control to meet requirements caused according to the rotation speed V can be performed.

In particular, in the present embodiment, by dividing the low-speed rotation range (less than the third rotation speed V3) into three sections of the run-up section, the small motion section, and the intermittent section, a proper measure according to the rotation speed can be taken to realize both smoothness of the rotation of the ultrasonic motor 5 and reduction in abnormal noise.

Next, FIG. 7 is a setting example of values for each operation mode of the ultrasonic motor 5. In the control unit 23, for each operation mode of the manual collimation mode, the automatic collimation mode, and the automatic tracking mode, the values of the control cycle WT, the upward slope RT, the downward slope FT, and the acceleration period OT are set in advance. While fixing these control cycle WT, upward slope RT, downward slope FT, acceleration period OT, and amplitude of the drive signal, the control unit 23 performs speed adjustment during collimation or tracking by increasing or decreasing the drive frequency f. As the drive frequency f, a preferable value or a preferable varying range (minimum value and maximum value) is also preferably set for each operation mode.

As shown in FIG. 7, for example, although high-speed control is performed in the automatic collimation mode, low-speed control is performed in the automatic tracking mode, so that it is also preferable that the control cycle WT (a [ms]) of the tracking mode is set to be shorter than the control cycle WT (A [ms]) of the automatic collimation mode (a <A). Accordingly, noise sounding can be reduced in the automatic collimation mode, and feedback response can be made quicker and the tracking performance can be improved in the automatic tracking mode. In the manual collimation mode, temporal constraints are relaxed more than in the automatic collimation mode, so that it is also possible that the control cycle WT of the manual collimation mode is set to be longer (2.5 A) than the control cycle WT (A [ms]) of the automatic collimation mode, and the slope is correspondingly set longer (1.25 A) to reduce noise.

In the manual collimation mode, the rotary shaft is largely rotated to the survey point and then finely rotated, so that the speed range to be used is from the first rotation speed V1 to the third rotation speed V3. Therefore, by using the waveform of the second drive signal S2 for low-speed rotation and the waveform of the third drive signal S3 for high-speed rotation, preferable control can be performed. Thus, depending on the operation mode, without using any of the first to fourth drive signals, only a drive signal in a section matching a rotation speed to be used is set, and setting of drive signals in other sections may be omitted.

Thus, by setting the control cycle WT, the upward slope RT, the downward slope FT, the acceleration period OT, and the drive frequency f of the drive signal for each operation mode of the surveying instrument 1, control to meet requirements caused according to the operation mode can be performed.

Next, a modification of the present embodiment is described. For example, to the surveying instrument 1, an operation mode to eliminate axial runout may be added. The ultrasonic motor 5 has a high holding force in a non-energizing time due to a frictional force between the stator 43 and the rotor 46, so that when motor operation stops, a problem may occur in which the rotary shaft 6 cannot return from an axial runout position to an original position. In order to solve this, the surveying instrument 1 may be provided with an operation mode in which a pair of a forward drive signal and a backward drive signal that apply equivalent rotation amounts are output to the ultrasonic motor 5 to return the rotary shaft 6 from an axial runout position to the original position after arriving at a rotation angle of a target position. It is also allowed that for this axial runout elimination mode, a drive signal in a section corresponding to a speed range to be used for this operation mode is set, and a control cycle WT, an upward slope RT, a downward slope FT, an acceleration period OT, and a drive frequency f thereof are set.

A preferred embodiment and a modification of the present invention are described above, and the above-described embodiment and modification can be combined based on knowledge of a person skilled in the art, and such alteration is included in the aim of the present invention.

DESCRIPTION OF REFERENCE NUMERALS

1 Surveying instrument
5, 12 Ultrasonic motor
6, 11 Rotary shaft
21, 22 Encoder
23 Control unit
S1 First drive signal
S2 Second drive signal
S3 Third drive signal
S4 Fourth drive signal
WT Control cycle
RT, FT Slope
OT Acceleration period
f Drive frequency

What is claimed is:

1. A method for controlling an ultrasonic motor that drives a rotary shaft of a surveying instrument in response to a drive signal with a variable frequency, wherein
in a low-speed rotation range, the low-speed rotation range being a speed range in which the ultrasonic motor cannot be continuously driven to rotate even if the drive signal is continuously applied,
the ultrasonic motor is controlled by a first drive signal in which a square wave is formed by applying and stopping the drive signal in control cycles, in a range of rotation speed of the rotary shaft from zero to a first rotation speed,
the ultrasonic motor is controlled by a second drive signal in which rises or falls of the square wave are sloped, in a range from the first rotation speed to a second rotation speed,
the ultrasonic motor is controlled by a third drive signal in which rises and falls of the square wave are sloped, in a range from the second rotation speed to a third rotation speed, and
in a range higher than the third rotation speed, the range being a speed range in which the ultrasonic motor comes out of the low-speed rotation range,
the ultrasonic motor is controlled by a fourth drive signal in which the drive signal is continuously applied.

2. The method for controlling an ultrasonic motor according to claim 1, wherein
the control cycles and the frequencies of the first to fourth drive signals, acceleration periods as times of application of the drive signal in the first to third drive signals, and values of the slopes of the second and third drive signals, are set for each of a plurality of operation modes of the surveying instrument.

3. The method for controlling an ultrasonic motor according to claim 2, wherein in at least one of the operation modes, at least one of controls by the first to fourth drive signals is omitted.

4. A surveying instrument comprising:
a rotary shaft;
an ultrasonic motor that drives the rotary shaft in response to a drive signal with a variable frequency;
an encoder that detects a rotation speed of the rotary shaft; and
a control unit that
performs control, in a low-speed rotation range which the ultrasonic motor cannot be continuously driven to rotate even if the drive signal is continuously applied, by a first drive signal in which a square wave is formed by applying and stopping the drive signal in control cycles in a range of rotation speed of the rotary shaft from zero to a first rotation speed, performs control by a second drive signal in which rises or falls of the square wave are sloped in a range from the first rotation speed to a second rotation speed, performs control by a third drive signal in which rises and falls of the square wave are sloped in a range from the second rotation speed to a third rotation speed, and performs control in a range higher than the third rotation speed which the ultrasonic motor comes out of the low-speed rotation range, by a fourth drive signal in which the drive signal is continuously applied.

* * * * *